United States Patent [19]
Yelin et al.

[11] 3,795,482
[45] Mar. 5, 1974

[54] HYDROGEN PEROXIDE AND NITRITE OR NITROUS ACID OXIDATION OF POLYESTER FIBERS

[75] Inventors: Robert E. Yelin, Willingboro; Jeffrey R. Frazier, Rocky Hill, both of N.J.; Ralph F. Villiers, Mexico, 10 D.F., Mexico

[73] Assignee: FMC Corporation, New York, N.Y.

[22] Filed: Dec. 15, 1971

[21] Appl. No.: 208,387

[52] U.S. Cl. ............................. 8/115.5, 260/75 T
[51] Int. Cl. ............................................. D06m 5/06
[58] Field of Search .. 8/DIG. 4, DIG. 6, 168, 115.5; 260/75 T

[56] References Cited
UNITED STATES PATENTS 3,360,448   12/1967   Schneider et al. ............ 260/75 T X
3,418,066   12/1968   Caldwell et al. ............... 260/75 T X

OTHER PUBLICATIONS

Review of Textile Progress, Vol. 15, 1963, pages 466 & 467, Pub. by the Textile Institute, London, Eng.

*Primary Examiner*—Donald Levy

[57] ABSTRACT

This invention provides a process for treating polyester materials employing a treatment solution containing a synergistic combination of hydrogen peroxide values and nitrites (or nitrous acid) whereby the cotton-like hand of the polyester is improved and the polyester is made cationocally dyeable.

6 Claims, No Drawings

HYDROGEN PEROXIDE AND NITRITE OR NITROUS ACID OXIDATION OF POLYESTER FIBERS

This invention concerns the modification of polyester fibers of a type suitable for the manufacture of textiles in which the cotton-like hand is improved and the fiber is made cationically dyeable.

Polyester fibers like other man made fibers are usually white and therefore do not require bleaching of the type normally required for natural fibers such as cotton. However, polyester fibers are usually difficult to dye with cationic dyes. This difficulty has been overcome by adding specialized monomers prior to polymerization. This is known in the trade as "ionic incorporation" into the resulting polyester which permits cationic dyeing. However, such techniques of imparting cationic dyeability alter the backbone of the polyester which is often detrimental to the cloth making qualities of the polyester material. It would be advantageous if already polymerized non-cationically dyeable polyester fiber could be modified and made cationically dyeable.

Such a post polymerization treatment is provided by this invention having the significant technical advantage of making available polyester material cationically dyeable, and improving its hand without affecting the excellent cloth making property of the polyester and without the extra expense of employing modified or specialized monomers to produce a cationically dyeable polyester.

This invention, described in summary form, provides a process for treating polyester material of the type suitable for the production of textiles to improve its cotton-like hand and make it cationically dyeable. The process consists of contacting the polyester material with a treatment solution containing a synergistic combination of hydrogen peroxide (or compounds which produce hydrogen peroxide in solution) and a nitrite and/or nitrous acid for a sufficient time to modify the polyester. Adjusting the pH of the treatment solution improves the process by regulating the reaction. The process is also improved by the addition of a peroxydisulfate to the treatment solution. The concentration of hydrogen peroxide values in the treatment solution and amount of treatment solution employed should be sufficient to provide at least about 0.5% and preferably about 300% hydrogen peroxide values based upon the weight of polyester being treated. The ratio of hydrogen peroxide values to total nitrites and nitrous acid in the treatment solution should be between 0.2:1 and 5:1, with 0.5:1 being preferred.

Specifically, polyester material is treated by the process provided by this invention with a treatment solution having a pH greater than 2 and containing hydrogen peroxide values and a nitrite and/or nitrous acid, at a temperature of at least about 70°F and preferably at the boiling point for sufficient time to modify the polyester.

The polyester material for which this process is useful is that type of polyester suitable for weaving or producing textiles. The characteristics of such polyester material are well known in the textile art. Such polyester material has been defined in Chemical Process Monograph, No. 25, "Man Made Fiber Processing," 1966, by Authur Alexander and published by Noyes Development Corporation, at page 77 as "... any fiber in which the fiber-forming substance is any long chain synthetic polymer composed of at least 85% by weight of an ester of a dihydric alcohol and terephthalic acid (p—HOOC—$C_6H_4$—COOH)." Preferably the polyester is that type of polyester normally used for producing cloth consisting of 100% polyester or polyester-cotton blends. Such polyesters are well known and sold under trade names such as Dacron and Kodel. The polyester material can be in the form of resin chips or fibers; preferably the polyester is spun into fibers.

Hydrogen peroxide values in the treatment solution need not be obtained directly by the addition of hydrogen peroxide; compounds which produce hydrogen peroxide in solution can be used to provide part or all of the hydrogen peroxide values. Examples of such chemicals are sodium perborate and sodium percarbonate.

Examples of useful nitrites are: sodium nitrite, potassium nitrite, magnesium nitrite and the like. While neither hydrogen peroxide nor the nitrogen compound selected from the group consisting of nitrites and nitrous acid are very effective by themselves, in combination they produce a synergistic effect.

Cationic dyeing of fibers is a well known process in the textile industry. Examples of cationic dyes are Sevron Blue ER, Basic Green No. 4 (Malachite Green) and Basic Blue No. 9 (Methylene Blue).

The concentration of the chemicals in the treatment solution can vary significantly without affecting the properties imparted to the polyester as a result of the treatment process. However, the combined affects of concentration and ratio are important. That is, the concentration of chemicals in the treatment solution and the ratio of treatment solution to material treated should be such that the resulting percentage of hydrogen peroxide is at least about 0.5 percent and preferably about 300% based on the weight of polyester material being treated. This is accomplished by varying the concentration of hydrogen peroxide values in the treatment solution in combination with varying the ratio of treatment solution to polyester material.

The treatment solution preferably contains between 2% and 20% hydrogen peroxide values. The ratio of hydrogen peroxide values to the total amount of nitrites and nitrous acid in the treatment solution should be between 0.2:1 and 5:1, with a preferred ratio of 0.5:1.

Hydrogen peroxide concentrations of about 15 percent or higher in the treatment solution in combination with nitrite present in a ratio of $H_2O_2$/nitrite (or nitrous acid) of 0.5:1 or greater, results in a very reactive treatment solution which should be closely monitored in view of the exothermic nature of the process.

The quantity of treatment solution applied to the polyester material, expressed as a weight ratio of treatment solution to polyester, can vary from a ratio of at least about 1:1 to as high as 320 parts treatment solution per part of polyester. Ratios greater than 320:1 require large amounts of treatment solution which decreases the economy of the process. A ratio of treatment solution to polyester of about 20:1 is particularly preferred.

The temperature of the material during treatment is not critical and can vary from about room temperature up to about the boiling temperature of the treatment solution. Boiling temperature (about 100°C at normal atmosphere pressure) is preferred. Elevated pressures can be employed to permit treatment temperatures above 100°C which further reduce the reaction time.

Treatment time is not critical and can vary from about 1 minute up to several hours. Selection of the treatment time is determined by the degree of modification of the polyester material desired and the process temperature and pressure employed. With temperatures of about 100°C short treatment times (minutes) are adequate while with lower temperatures, longer treatment times (one to three hours) may be desired. However, since the treatment is not noticeably detrimental to the cloth making qualities of the polyester temperatures of about 100°C can be used with treatment times of one hour or more.

The reaction rate for the process can be increased by adjusting the pH of the treatment solution downward from the natural pH of the aqueous treatment solution to a pH of betwen 2 and 4. The natural pH is usually about 6.5–7.5 depending upon the water source. While the natural pH is adequate, preferred reaction rates are obtained at pH values between about 3 and 4. In no event should the pH of the treatment solution be adjusted to below about 2 because at such low pH values the reaction is so fast as to be ineffective and difficult to control. The pH adjustment should be performed after the polyester is in contact with the treatment solution. Boiling temperatures are rapidly obtained by pH adjustment of the treatment solution to between 2 and 4 due to the exothermic reaction and because of the speed of the reaction after pH adjustment.

Any acid that is inert towards hydrogen peroxide is suitable for increasing the reactivity of the treatment solution by lowering the pH. Inert towards hydrogen peroxide as used herein, means any acid that does not induce a significant amount of decomposition of a hydrogen peroxide solution. Examples of suitable acids are hydrochloric acid, sulfuric acid, sodium dihydrogen phosphate and the like.

The treatment process is performed by contacting the polyester and treatment solution by conventional means. For example, the polyester material can be immersed in a batch of treatment solution maintained at the desired temperature and then separated and washed after the treatment time has elapsed. Alternatively, the process can be performed continuously employing a J-box into which the polyester fibers already impregnated with treatment solution are continuously fed at a rate sufficient to provide a retention time in the J-box equal to the desired treatment time.

The addition of a water-soluble peroxydisulfate salt to the treatment solution improves the cationic dyeability of the treated polyester. Examples of suitable peroxydisulfates are potassium peroxydisulfate, sodium peroxydisulfate, ammonium peroxydisulfate and the like water-soluble salts. Significant improvement is obtained with peroxydisulfate concentration in the treatment solution in the range of about 0.2 to 1.0 percent with 0.5 percent being preferred.

Standardized testing procedures described in Example 1 were employed in all the examples to analyze the effects of the treatment process upon polyester samples. All proportions used herein are based upon weight unless otherwise specified.

EXAMPLE 1

A sample of material consisting of typical polyester cloth obtained from a standard source (Type 54 spun Dacron woven fabric, lot 4077, style 754AW, obtained from Testfabrics Inc., 55 Van Dam Street, New York, New York 10013) was refluxed for 60 minutes at 100°C in an aqueous treatment solution containing 30 g. of hydrogen peroxide (50 percent solution) per 100 ml. of treatment solution and 30 g. of sodium nitrite per 100 ml. of solution with the balance being water. The pH of the treatment solution was 6.5. The treatment solution was used at a ratio of 20 parts treatment solution per part of sample material. After 60 minutes the material was removed from the reflux solution, washed with water, scoured and dyed with a cationic dye (Sevron Blue ER) employing a standard dyeing procedure.

After dyeing, the sample was washed with a detergent, rinsed, and the degree of dyeing was analyzed employing a Hunterlab D-40 reflectometer using a green filter. From the reflectances obtained with the reflectometer a K/S ratio was determined employing the following formula:

$$K/S = (1 - R)^2/2R$$

wherein R is the percent reflectance and K/S is the ratio of absorption coefficient to scattering coefficient. The significance of K/S values obtained by the above method is that low K/S values correspond to (a) low absorbency, (b) high reflectance, and (c) low degree of dyeing. The dyed, washed and rinsed fabric was tested for colorfastness to crocking according to American Association of Textile Chemists and Colorists (AATCC) Test Method No. 8-1969. The larger the crocking test value, the greater the colorfastness of the dyed fabric. Fractional differences in crocking test values are significant. In addition the carboxyl group content of the polyester was measured in terms of equivalents of COOH per $10^6$ g. of polyester. Increases in carboxyl (anion) group content indicates that the material will be more receptive to cationic dyeing. The results of the tests are reported in Table I. Furthermore, testing of the treated cloth for properties which indicate its cloth making qualities, indicated that there were no detrimental effects upon the polyester. In addition the cloth like feel (hand) of the polyester was improved in that its feel was more cotton-like.

COMPARATIVE EXAMPLES A, B, AND C

The procedure of Example 1 was repeated employing aqueous treatment solution as follows: Example A, water; Example B, 30 g. hydrogen peroxide per 100 ml. of water; Example C, 30 g. sodium nitrite per 100 ml. of water. The results are reported in Table I. Since almost all of the dye was removed from the sample by washing steps, the resistance to crocking test was not performed.

EXAMPLE 2

A sample of polyester material identical to the material used in Example 1 was immersed in a bath of treatment solution at room temperature and containing 30 g. of 50 percent hydrogen peroxide solution per 100 ml., 30 g. of sodium nitrite per 100 ml. and 0.5 g. of ammonium peroxydisulfate per 100 ml. The treatment solution to polyester ratio was 20:1. The pH of the treatment bath was lowered from 6.5 to 3.5 with sulfuric acid. The temperature of the treatment solution — polyester bath quickly rose to the boiling point (about 10 sec.) and after one minute of boiling, the polyester material was removed from the bath. The polyester material was washed, scoured, dyed, washed and tested employing the same procedures used in Example. The results are reported in Table I. Furthermore, testing of the treated cloth for properties which indicate its cloth making qualities, indicated that there were no detrimental effects upon the polyester from the process. In addition the cloth-like feel (hand) of the polyester was improved in that its feel was more cotton-like.

Synthetic materials of the type suitable for producing textile fibers can be treated by the process to provide the expected results of ionic incorporation or oxidation such as carboxyl group incorporation into polyester. Examples of such synthetic materials in addition to polyester are acrylics, polyamides, polyethylene, polypropylene and the like. The process results in improved properties for the treated material and fabrics produced from the treated material. Properties of fabrics that are improved by ionic incorporation or oxidization include cationic dyeability, moisture regain and retention, electrostatic charge dissipation, adherence between fabric and textile finishes, soil release and/or soil repellence.

TABLE I

| Example No. | K/S ratio | Carboxyl content | AATCC Test Crocking |
|---|---|---|---|
| 1 ($H_2O_2$+HaNO$_2$) | 1.75 | 38.7 | ~ 4 |
| 2 ($H_2O_2$,NaNO$_2$+ $(NH_4)_2S_2O_8$) | 2.03 | 45.2 | ~ 4 |
| A (water) | 0.35 | 19.2 | * |
| B ($H_2O_2$) | 0.45 | 19.2 | * |
| C (nitrite) | 0.35 | 19.2 | * |

* Crocking test not performed.

What is claimed is:

1. A process for treating linear polyester fibers of the type suitable for the production of textiles to improve the cotton-like hand of the polyester and impart cationic dyeability, comprising contacting the polyester fiber with a treatment solution at a ratio of treatment solution to polyester of between 1:1 and 320:1 for between 1 and 180 minutes, said treatment solution having a pH from the natural pH of the treatment solution to at least 2 and containing hydrogen peroxide values at a concentration sufficient to provide at least 0.5% hydrogen peroxide values based upon the weight of polyester, and a nitrogen compound selected from the group consisting of water-soluble inorganic nitrites and nitrous acid, said nitrogen compound being present in a ratio of hydrogen peroxide values to nitrogen compound of between 0.2:1 and 5:1.

2. The process of claim 1 wherein the treatment solution contains at least 0.2 percent of a water-soluble peroxydisulfate salt.

3. The process of claim 2 wherein the peroxydisulfate concentration is 0.5 percent.

4. The process of claim 2 wherein the pH of the treatment solution is adjusted to between 3 and 4 with a hydrogen peroxide inert acid after the polyester fiber is in contact with the treatment solution.

5. The process of claim 1 wherein the concentration of hydrogen peroxide values in the treatment solution and the ratio of treatment solution to polyester are sufficient to provide about 3.0 percent hydrogen peroxide values based upon the weight of polyester and wherein the ratio of hydrogen peroxide values to nitrogen compound is about 0.5:1.

6. The process of claim 5 wherein the pH of the treatment solution is adjusted to between 3 and 4 with a hydrogen peroxide inert acid after the polyester fiber is in contact with the treatment solution.

* * * * *